(12) United States Patent
Kim

(10) Patent No.: US 10,368,390 B2
(45) Date of Patent: Jul. 30, 2019

(54) METHOD AND ELECTRONIC DEVICE FOR PROVIDING COMMUNICATION FUNCTION

(71) Applicant: Samsung Electronics Co., Ltd., Gyeonggi-do (KR)

(72) Inventor: Hye-Jeong Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 157 days.

(21) Appl. No.: 15/469,791

(22) Filed: Mar. 27, 2017

(65) Prior Publication Data
US 2017/0280506 A1    Sep. 28, 2017

(30) Foreign Application Priority Data
Mar. 25, 2016    (KR) .................... 10-2016-0036220

(51) Int. Cl.
| | | |
|---|---|---|
| *H04W 84/04* | (2009.01) | |
| *H04L 12/28* | (2006.01) | |
| *H04L 12/64* | (2006.01) | |
| *H04W 72/04* | (2009.01) | |
| *H04W 72/12* | (2009.01) | |

(Continued)

(52) U.S. Cl.
CPC ......... *H04W 84/045* (2013.01); *H04L 1/0001* (2013.01); *H04L 1/0033* (2013.01); *H04L 5/0053* (2013.01); *H04L 12/2854* (2013.01); *H04L 12/64* (2013.01); *H04W 72/0493* (2013.01); *H04W 72/1215* (2013.01); *H04W 84/12* (2013.01); *H04W 88/00* (2013.01); *H04W 88/02* (2013.01); *H04W 88/06* (2013.01)

(58) Field of Classification Search
None
See application file for complete search history.

(56) References Cited

U.S. PATENT DOCUMENTS

2013/0242843 A1*   9/2013   Kojima .................. H04W 4/06
                                                              370/312
2013/0242897 A1    9/2013   Meylan et al.
(Continued)

FOREIGN PATENT DOCUMENTS

| EP | 2 704 481 | 3/2014 |
|---|---|---|
| EP | 2 993 796 | 3/2016 |
| KR | 1020150031663 | 3/2015 |

OTHER PUBLICATIONS

European Search Report dated Aug. 18, 2017 issued in counterpart application No. 17162810.0-1874, 8 pages.

*Primary Examiner* — Kodzovi Acolatse
(74) *Attorney, Agent, or Firm* — The Farrell Law Firm, P.C.

(57) ABSTRACT

An electronic device is provided. The electronic device includes a first communication module configured to communicate with an external device through a first communication scheme, a second communication module configured to communicate with the external device through a second communication scheme, and a processor configured to identify a state of the second communication module, generate availability information indicating whether the second communication module is available to perform a same function with the first communication module, based on the state of the second communication module, and control the first communication module or the second communication module to transmit the availability information of the second communication module to the external device.

17 Claims, 8 Drawing Sheets

(51) Int. Cl.
*H04W 84/12* (2009.01)
*H04W 88/06* (2009.01)
*H04L 1/00* (2006.01)
*H04W 88/00* (2009.01)
*H04W 88/02* (2009.01)
*H04L 5/00* (2006.01)

(56) References Cited

U.S. PATENT DOCUMENTS

| | | | |
|---|---|---|---|
| 2014/0078906 A1* | 3/2014 | Chen | H04L 69/18 370/237 |
| 2014/0293970 A1 | 10/2014 | Damnjanovic et al. | |
| 2015/0095493 A1* | 4/2015 | Xu | H04B 3/542 709/225 |
| 2015/0110048 A1 | 4/2015 | Damnjanovic et al. | |
| 2015/0334724 A1* | 11/2015 | Faccin | H04W 76/36 370/235 |
| 2015/0350952 A1* | 12/2015 | Ozturk | H04W 28/085 370/329 |
| 2016/0088542 A1* | 3/2016 | Belghoul | H04W 28/0268 370/331 |
| 2016/0135120 A1* | 5/2016 | Sirotkin | H04W 48/18 370/329 |
| 2016/0366629 A1* | 12/2016 | Wu | H04W 36/165 |
| 2018/0176822 A1* | 6/2018 | Kim | H04W 24/10 |

* cited by examiner

METHOD AND ELECTRONIC DEVICE FOR PROVIDING COMMUNICATION FUNCTION

PRIORITY

This application claims priority under 35 U.S.C. § 119(a) to a Korean Patent Application filed in the Korean Intellectual Property Office on Mar. 25, 2016, and assigned Serial No. 10-2016-0036220, the entire disclosure of which is incorporated herein by reference.

BACKGROUND

1. Field of the Disclosure

The present disclosure relates generally to an electronic device supporting a communication function.

2. Description of the Related Art

An important aspect in providing high-speed wireless data services in cellular wireless communication systems is the ability to support scalable bandwidths. For example, long term evolution (LTE) systems may have various bandwidths, such as 20 MHz, 15 MHz, 10 MHz, 5 MHz, 3 MHz, 1.4 MHz, etc. Service providers may select one or more of the bandwidths to provide a service, and terminals may support various bandwidths, e.g., from supporting a maximum bandwidth of 20 MHz to supporting a minimum bandwidth of 1.4 MHz.

Aggregation is a technique for aggregating a plurality of bandwidths into one bandwidth for communication. The aggregation is performed at a radio level and is also possible through load awareness, thus increasing a network capacity and improving a user's usability, e.g., download speed, etc.

SUMMARY

Current technology schemes do not consider a relationship with the use of an existing wireless local area network (WLAN) used in a terminal during Wi-Fi frequency band aggregation (e.g., LTE-WLAN aggregation, dual connectivity, LTE-licensed assisted access (LAA), LTE-unlicensed (LTE-U), etc.). For example, the current technology schemes assume that the terminal has a separate WLAN module (e.g., a WLAN baseband chip or a WLAN radio frequency (RF) module) for WLAN frequency band aggregation. However, every terminal may not add a separate WLAN module for aggregation, and some terminals may select and use one WLAN module for two purposes, the original purpose and aggregation. In this case, there is no function for switching the WLAN module between the original purpose and aggregation, and an LTE network is not aware of the purpose for which the WLAN module is used, such that the LTE network may not be able to manage aggregation for the terminal.

The present disclosure has been made to address at least the above-mentioned problems and/or disadvantages and to provide at least the advantages described below.

Accordingly, an aspect of the present disclosure is to provide a method for efficiently managing WLAN aggregation according to a state of an electronic device.

In accordance with an aspect of the present disclosure, an electronic device is provided. The electronic device includes a first communication module configured to communicate with an external device through a first communication scheme, a second communication module configured to communicate with the external device through a second communication scheme, and a processor configured to identify a state of the second communication module, generate availability information indicating whether the second communication module is available to perform a same function with the first communication module, based on the state of the second communication module, and control the first communication module or the second communication module to transmit the availability information of the second communication module to the external device.

In accordance with another aspect of the present disclosure, a method for operating an electronic device including a first communication module and a second communication module. The method includes identifying a state of the second communication module, generating availability information indicating whether the second communication module is available to perform a same function with the first communication module, based on the state of the second communication module, and transmitting the availability information of the second communication module to the external device, wherein the first communication module is configured to communicate with an external device through a first communication scheme and the second communication module configured to communicate with the external device through a second communication scheme.

In accordance with another aspect of the present disclosure, a storage medium included in an electronic device including a first communication module and a second communication module is provided. The storage medium has stored thereon instructions that, when executed, perform the steps of identifying a state of the second communication module, generating availability information indicating whether the second communication module is available to perform a same function with the first communication module, based on the state of the second communication module, and transmitting availability information of the second communication module to the external device, wherein the first communication module is configured to communicate with an external device through a first communication scheme and the second communication module configured to communicate with the external device through a second communication scheme.

BRIEF DESCRIPTION OF THE DRAWINGS

The above and other aspects, features and advantages of the present disclosure will be more apparent from the following description taken in conjunction with the accompanying drawings, in which.

DETAILED DESCRIPTION OF EMBODIMENTS OF THE PRESENT DISCLOSURE

Figure 1:
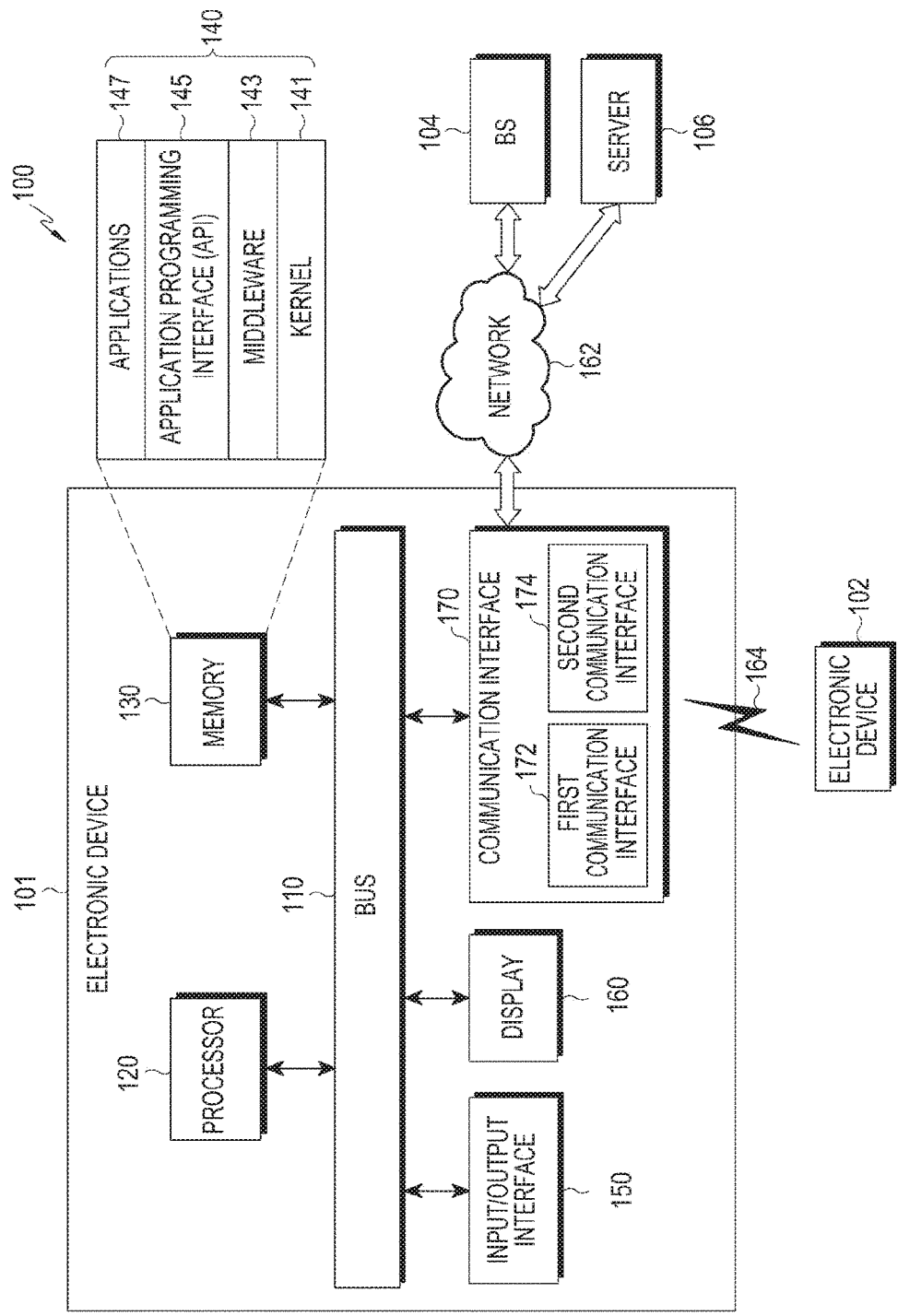
FIG. 1 is a block diagram of a network environment including an electronic device, according to an embodiment of the present disclosure.

Various embodiments of the present disclosure will be disclosed with reference to the accompanying drawings, in which similar reference numbers may be used to refer to similar components. However, the description is not intended to limit the present disclosure to particular embodiments, and it should be construed as including various modifications, equivalents, and/or alternatives of the embodiments described herein. I In the present disclosure, expressions such as "have", "include", and "comprise" indicate the existence of a corresponding characteristic (e.g., a numerical value, a function, an operation, or an element like a part) and do not exclude the existence of additional characteristics.

In the present disclosure, expressions such as "A or B", "at least one of A or/and B" and "one or more of A or/and B" may include all possible combinations of items listed together. For example, "A or B", "at least one of A and B" and "one or more of A or B" may refer to (1) A, (2) B, or (3) A and B.

Expressions such as "first", "second", "primarily", or "secondary" used herein, may represent various elements regardless of order and/or importance and do not limit the corresponding elements. For example, a first user device and a second user device may represent different user devices regardless of order or importance. For example, a first element may be referred to as a second element without departing from the scope of the present disclosure, and similarly, a second element may be referred to as a first element.

When it is described that an element (such as a first element) is "coupled" or "connected" with/to another element (such as a second element), the element can be directly connected to the other element or can be connected to the other element through another element (e.g., a third element). However, when it is described that an element (such as a first element) is "directly connected" or "directly coupled" with/to another element (such as a second element), it means that there is no intermediate element (such as a third element) between the element and the other element.

The expression "configured (or set) to" used in the present disclosure may be used interchangeably with, for example, the expressions "suitable for", "having the capacity to", "designed to", "adapted to", "made to" and "capable of" according to a situation. The expression "configured (or set) to" does not mean only "specifically designed to" in hardware. Alternatively, in some situations, the expression "an apparatus configured to" may mean that the apparatus "can" operate together with another apparatus or component. For example, the expression "a processor configured (or set) to perform A, B, and C" may refer to a dedicated processor (e.g., an embedded processor) for performing a corresponding operation or a generic-purpose processor (such as a central processing unit (CPU) or an application processor) that can perform a corresponding operation by executing at least one software program stored at a memory device.

Terms defined in the present disclosure are only used for describing specific embodiments of the present disclosure and are not intended to limit the scope of the present disclosure. Terms provided in singular forms are intended to include plural forms as well, unless the context clearly indicates otherwise. All of the terms used herein, including technical or scientific terms, have the same meanings as those generally understood by an ordinary person skilled in the related art, unless otherwise defined herein. Terms defined in a generally used dictionary should be interpreted as having meanings that are the same as or similar to the contextual meanings of the relevant technology and should not be interpreted as having ideal or exaggerated meanings, unless expressly so defined herein. In some cases, terms defined in the present disclosure should not be interpreted to exclude the embodiments of the present disclosure.

An electronic device according to various embodiments of the present disclosure may include at least one of a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. The wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), etc.

According to some embodiments of the present disclosure, the electronic device may be a home appliance. The home appliance may include a television (TV), a digital versatile disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console, an electronic dictionary, an electronic key, a camcorder, and an electronic frame.

According to other embodiments of the present disclosure, the electronic device may include at least one of various medical equipment (for example, a magnetic resonance angiography (MRA) device, a magnetic resonance imaging (MRI) device, a computed tomography (CT) device, an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass), an avionics device, a security device, a vehicle head unit, an industrial or home robot, an automatic teller machine (ATM), a point of sale (POS) device, an Internet of things (IoT) device (e.g., an electric light bulb, a sensor, an electricity or gas meter, a sprinkler device, a fire alarm device, a thermostat, a streetlight, a toaster, an exercise machine, a hot-water tank, a heater, a boiler, etc.).

According to some embodiments of the present disclosure, the electronic device may include a part of a furniture or building/structure, an electronic board, an electronic signature receiving device, a projector, and various measuring instruments (e.g., a water, electricity, gas, or electric wave measuring device).

The electronic device may be a flexible electronic device.

The electronic device may be one of the above-listed devices or a combination thereof.

The electronic device is not limited to the above-listed devices and may include new electronic devices according to technical development.

Hereinafter, an electronic device according to an embodiment of the present disclosure will be described with reference to the accompanying drawings. The term "user" used herein may refer to a person who uses the electronic device or a device using the electronic device.

FIG. 1 is a block diagram of a network environment including an electronic device, according to an embodiment of the present disclosure.

Referring to FIG. 1, an electronic device 101 in a network environment 100 is provided.

The electronic device 101 includes a bus 110, a processor 120, a memory 130, an input/output (I/O) interface 150, a display 160, and a communication interface 170. The electronic device 101 may omit at least one of the foregoing elements or may further include other elements.

The bus 110 includes a circuit for connecting the elements 110 to 170 of the electronic device 101 and delivering communication (e.g., a control message and/or data) between the elements 110 to 170.

The processor 120 includes one or more of a central processing unit (CPU), an application processor (AP), and a communication processor (CP). The processor 120 performs operations or data processing for control and/or communication of at least one other element of the electronic device 101.

The processor 120 identifies a state of a first communication module 172 or a second communication module 174 included in the communication interface 170 and determines availability indicating whether the first communication module 172 and the second communication module 174 may simultaneously perform the same function, based on the identified state. The processor 120 generates information about the availability. The processor 120 controls the communication interface 170 to transmit the availability information to an external device (e.g., the base station (BS) 104, etc.).

When the communication interface 170 includes a single WLAN module, the processor 120 may determine whether to use the WLAN module for WLAN communication, for LTE-WLAN aggregation, or for both WLAN communication and LTE-WLAN aggregation at the same time. The LTE-WLAN aggregation may indicate that the electronic device 101 performs LTE communication with an external device (e.g., the BS 104, a WLAN access point (AP) operating with the BS 104, a server 106, etc.). When the WLAN module is used for LTE-WLAN aggregation, the electronic device 101 performs cellular communication (e.g., LTE, etc.) by using both a cellular module and a WLAN module, which are connected to the external device through different communication channels. For example, for dual connectivity, a cellular BS and a WLAN AP may simultaneously operate with each other, such that the cellular BS and the terminal may transmit and receive data at the same time through a cellular network and a WLAN network. In this case, the WLAN module may use resources such as an RF, an antenna, a baseband, etc., for cellular communication. For example, in LTE-LAA, the cellular BS and the terminal may transmit and receive cellular data by using a cellular network frequency and a WLAN frequency in a carrier aggregation manner. In this case, the resources of the WLAN module, such as the antenna, the RF, etc. may be used for cellular communication. According to a WLAN aggregation scheme, one WLAN aggregation and other WLAN functions (e.g., Internet communication, WLAN direct, etc.) may be supported at the same time.

Once the processor 120 determines to use the WLAN module for WLAN communication, the WLAN module performs an Internet connection through the WLAN, WLAN direct connection, WLAN interworking through S2a interface or S2b interface, hot spot, tethering, device paring, etc. If the processor 120 determines to use the WLAN module for both WLAN communication and LTE-WLAN aggregation at the same time, the WLAN module may be used for both WLAN communication and LTE-WLAN aggregation at the same time.

If the processor 120 determines to use the WLAN module for LTE-WLAN aggregation, the WLAN module may be used for LTE-WLAN aggregation.

According to an embodiment, the processor 120 may control the WLAN module to perform an operation according to a purpose-specific priority of the WLAN module, which is previously stored in the memory 130 or is set by a user. For example, if the priority of LTE-WLAN aggregation is set higher than the priority of tethering, the processor 120 may control the WLAN module to terminate tethering and to perform an operation corresponding to LTE-WLAN aggregation.

The memory 130 may include a volatile and/or nonvolatile memory. The memory 130 may store instructions or data associated with at least one other element of the electronic device 101. The memory 130 may store software and/or a program 140. The program 140 includes at least one of a kernel 141, middleware 143, an application programming interface (API) 145, and/or applications 147. At least some of the kernel 141, the middleware 143, and the API 145 may be referred to as an operating system (OS).

The memory 130 may store a purpose-specific priority of the WLAN module. The purpose-specific priority of the WLAN module may be stored in a priority table, for example, as shown in Table 1.

TABLE 1

| Priority | Purpose of WLAN Module |
|---|---|
| First Priority | Internet Connection |
| Second Priority | Tethering |
| Third Priority | LTE-WLAN aggregation |
| Fourth Priority | WLAN Direct Connection |
| Fifth Priority | WLAN Interworking through S2a |
| ... | ... |

It can be seen from the priority table of Table 1 that the priority of LTE-WLAN aggregation, among purposes of the WLAN module of the electronic device 101, is lower than those of Internet connection and tethering and higher than those of WLAN direct connection, WLAN interworking through S2a, etc. The processor 120 determines an operation of the WLAN module based on Table 1. The memory 130 stores the priority table for the electronic device 101.

The kernel 141 may control or manage system resources (e.g., the bus 110, the processor 120, the memory 130, etc.) used to execute operations or functions implemented in other programs (e.g., the middleware 143, the API 145, or the applications 147). The kernel 141 provides an interface through which the middleware 143, the API 145, or the applications 147 access separate components of the electronic device 101 to control or manage the system resources.

The middleware 143 may work as an intermediary for allowing the API 145 or the applications 147 to exchange data in communication with the kernel 141.

In addition, the middleware 143 may process one or more task requests received from the applications 147 based on priorities. For example, the middleware 143 may give a priority for using a system resource (e.g., the bus 110, the processor 120, the memory 130, etc.) of the electronic device 101 to at least one of the applications 147. The middleware 143 may perform scheduling or load balancing with respect to the one or more task requests by processing the one or more task requests based on the priority given to the at least one of the applications 147.

The API 145 is an interface used for the applications 147 to control a function provided by the kernel 141 or the middleware 143, and includes at least one interface or function (e.g., a command) for file control, window control, image processing, or character control.

The I/O interface 150 serves as an interface for delivering a command or data input from a user or another external device to other components of the electronic device 101. The I/O interface 150 may also output a command or data received from other components of the electronic device 101 to a user or another external device.

The display 160 includes a liquid crystal display (LCD), a light emitting diode (LED) display, an organic light emitting diode (OLED) display, a microelectromechanical system (MEMS) display, or an electronic paper display. The display 160 may display various contents (e.g., a text, an image, video, an icon, a symbol, etc.) to users. The display 160 may include a touch screen, and receive a touch, a gesture, proximity, or a hovering input by using an electronic pen or a part of a body of a user.

The communication interface 170 establishes communication between the electronic device 101 and an external electronic device 102, the (BS) 104, or the server 106). For example, the communication interface 170 may be connected to the external electronic device 102 through a short range communication 964 and may be connected to the BS 104 and the server 106 through a network 162 through wireless communication or wired communication to communicate with the external device.

The wireless communication may use, as a cellular communication protocol at least one of long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication includes the short-range communication 164. The short-range communication 164 includes at least one of Wi-Fi, Bluetooth (BT), Bluetooth low energy (BLE), Zigbee, near field communication (NFC), magnetic secure transmission (MST), and a global navigation satellite system (GNSS). Depending on a usage area or bandwidth, the GNSS may include at least one of a GPS, a global navigation satellite system (Glonass), a Beidou navigation satellite system (Beidou), and Galileo, the European global satellite-based navigation system. The term "GPS" may be used interchangeably with "GNSS".

The wired communication may include at least one of universal serial bus (USB), high definition multimedia interface (HDMI), recommended standard 232 (RS-232), and plain old telephone service (POTS). The network 162 may include a telecommunications network, for example, at least one of a computer network (e.g., a local area network (LAN) or a wide area network (WAN)), the Internet, and a telephone network.

The communication interface 170 includes at least one of the first communication module 172 and the second communication module 174. Each of the first communication module 172 and the second communication module 174 establishes communication between the electronic device 101 and an external device (e.g., the external electronic device 102, the BS 104, or the server 106). The first communication module 172 may be a cellular module for cellular communication, and the second communication module 174 may be a WLAN communication module for WLAN communication.

The first communication module 172 and the second communication module 174 receive data transmitted from an external device (e.g., the external electronic device 102, the BS 104, or the server 106) via one or more different communication channels, respectively, through WLAN aggregation. Assuming that a communication channel used for the first communication module 172 is a first channel and a communication channel used for the second communication module 174 is a second channel, the communication interface 170 may receive one cellular data (or data stream) by using the two communication channels. For example, assuming that the capacity of a data stream provided from a service provider (e.g., the external electronic device 102, the BS 104, or the server 106) is 100 Mbyte, the communication interface 170 may receive 50 Mbyte of the data stream through the first channel and the other 50 Mbyte through the second channel.

The communication interface 170 transmits the priority table stored in the memory 130 to the BS 104 under control of the processor 120.

The external electronic device 102 may be a device of the same type as or a different type than the electronic device 101. The external electronic device 102 is directly connected with the electronic device 101 to transmit data to and receive data from the electronic device 101. The external electronic device 102 may be remotely controlled by the electronic device 101 or may remotely control the electronic device 101.

The BS 104 may provide a communication service for the external electronic device 102 to use cellular communication, e.g., at least one of LTE, LTE-A, CDMA, WCDMA, UMTS, WiBro, GSM, etc.

The BS 104 may receive a message including availability information indicating WLAN aggregation availability of the second communication module of the electronic device 101 from the electronic device 101, through the first communication module. The BS 104 determines whether to allocate a communication channel necessary for data transmission and reception through the second communication module for WLAN aggregation to the electronic device 101 based on the availability information. The availability information indicates whether the electronic device 101 may be allocated with a communication channel by the BS 104. The BS 104 may not allocate a communication channel for the second communication module to the electronic device 101, if the second communication module of the electronic device 101 is not available based on the availability information. The BS 104 may allocate a communication channel for the second communication module to the electronic device 101, if the second communication module of the electronic device 101 is available based on the availability information.

The server 106 may include a group of one or more servers. Some or all of operations performed by the electronic device 101 may be performed in another electronic device or a plurality of electronic devices (e.g., the external electronic device 102 or the server 106). When the electronic device 101 has to perform a function or a service automatically or at a request, the electronic device 101 may request the external electronic device 102 or the server 106 to perform at least some functions associated with the function or the service, instead of or in addition to executing the function or the service itself. The external electronic device 102 or the server 106 may execute the requested function or an additional function and deliver the execution result to the electronic device 101. The electronic device 101 may then process or further process the received result to provide the requested function or service. To this end cloud computing, distributed computing, or client-server computing may be used.

Figure 2:
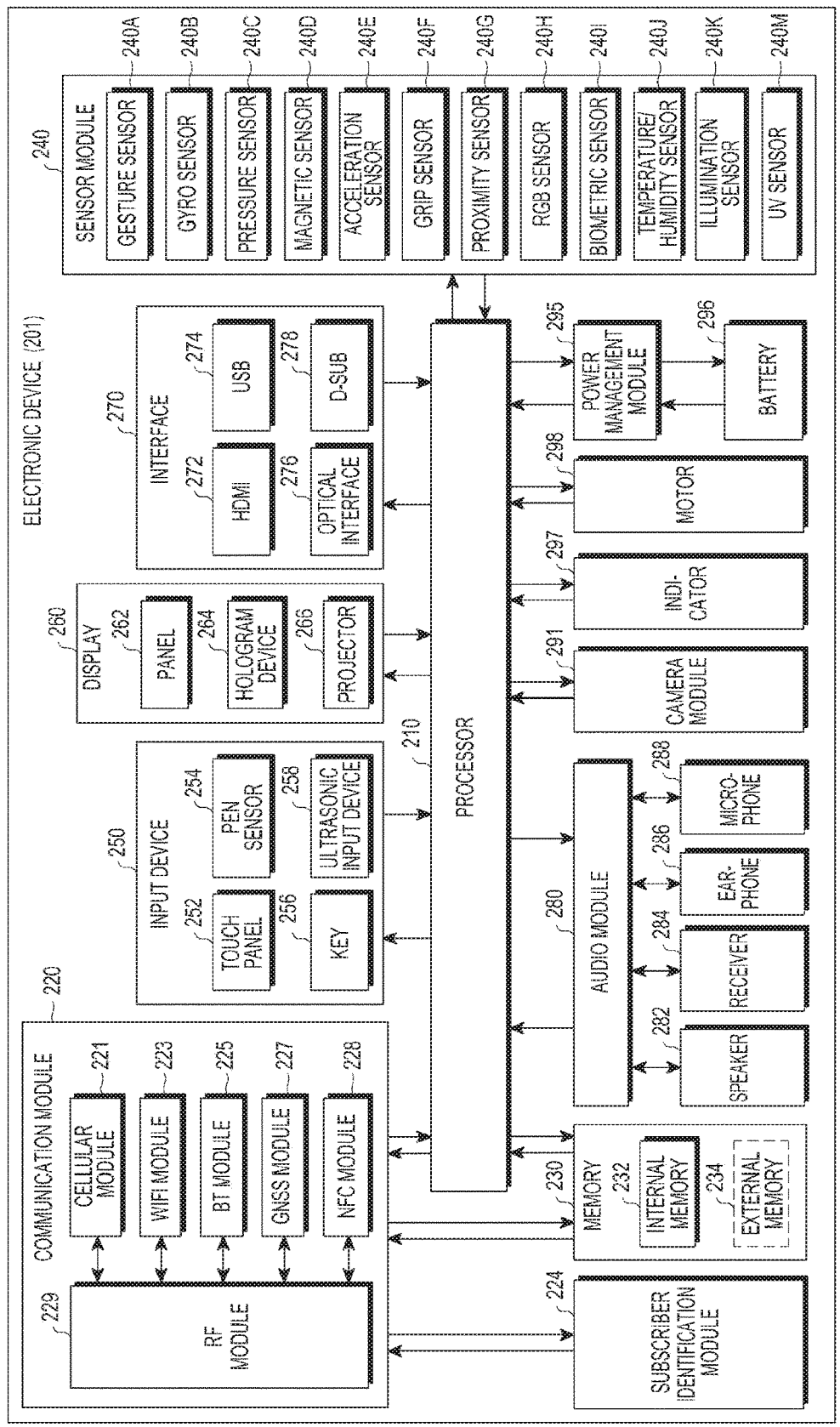
FIG. 2 is a block diagram of a configuration of an electronic device, according to an embodiment of the present disclosure.

FIG. 2 is a block diagram of a configuration of an electronic device, according to an embodiment of the present disclosure.

Referring to FIG. 2, an electronic device 201 is provided. The electronic device 201 includes an application processor (APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 controls multiple hardware or software components connected to the processor 210 by driving an OS or an application program, and performs processing and operations with respect to various data. The processor 210 may be implemented with a system on chip (SoC). The server 210 includes a graphics processing unit (GPU) and/or an image signal processor (ISP). The processor 210 may include at least some of the elements of the electronic device 201. The processor 210 loads a command or data received from at least one of other elements (e.g., a non-volatile memory) into a volatile memory to process the command or data, and stores various data in the non-volatile memory.

The communication module 220 includes at least one of a cellular module 221, a Wi-Fi module 223, a BT module 225, a GNSS module 227 (e.g., a GPS module, a Glonass module, a Beidou module, or a Galileo module), a NFC module 228, and a radio frequency (RF) module 229.

The cellular module 221 may provide a voice call, a video call, a text service, or an Internet service over a communication network. The cellular module 221 identifies and authenticates the electronic device 201 in a communication network by using the SIM 224. The cellular module 221 performs at least one of functions that may be provided by the processor 210. The cellular module 221 may include a communication processor (CP).

Each of the WiFi module 223, the BT module 225, the GNSS module 227, and the NFC module 228 may include a processor for processing data transmitted and received by a corresponding module. At least some of the cellular module 221, the WiFi module 223, the BT module 225, the GNSS module 227, and the NFC module 228 may be included in one integrated chip (IC) or IC package.

The RF module 229 may transmit and receive a communication signal (e.g., an RF signal). The RF module 229 may include a transceiver, a power amp module (PAM), a frequency filter, a low noise amplifier (LNA), or an antenna. At least one of the cellular module 221, the WiFi module 223, the BT module 225, the GNSS module 227, and the NFC module 228 may transmit and receive an RF signal through the separate RF module.

The SIM 224 may include a card including a SIM and/or an embedded SIM, and includes unique identification information (e.g., an integrated circuit card identifier (ICCID) or subscriber information (e.g., an international mobile subscriber identity (IMSI)).

The memory 230 includes an internal memory 232 and/or an external memory 234. The internal memory 232 may include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.), and a solid state drive (SSD).

The external memory 234 may further include a flash drive, for example, a compact flash (CF), a secure digital (SD), a micro-SD, a mini-SD, an extreme Digital (xD), a multi-media card (MMC), or a memory stick. The external memory 234 may be functionally and/or physically connected with the electronic device 201 through various interfaces.

The sensor module 240 measures physical a quantity or senses an operation state of the electronic device 201 to convert the measured or sensed information into an electric signal. The sensor module 240 may include at least one of a gesture sensor 240A, a gyro sensor 240B, a pressure sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illumination sensor 240K, and a ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor included therein. The electronic device 201 may further include a processor configured to control the sensor module 240 as part of or separately from the processor 210, to control the sensor module 240 during a sleep state of the processor 210.

The input device 250 includes a touch panel 252, a (digital) pen sensor 254, a key 256, or an ultrasonic input device 258.

The touch panel 252 may use at least one of a capacitive type, a resistive type, an IR type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or a separate recognition sheet.

The key 256 may include a physical button, an optical key, or a keypad.

The ultrasonic input device 258 senses ultrasonic waves generated by an input means through a microphone 288 and identifies data corresponding to the sensed ultrasonic waves.

The display 260 (e.g., the display 160) includes a panel 262, a hologram device 264, or a projector 266.

The panel 262 may be implemented to be flexible, transparent, or wearable. The panel 262 may be configured with the touch panel 252 in one module.

The hologram device 264 displays a stereoscopic image in the air by using an interference of light.

The projector 266 displays an image onto an external screen through projection of light. The screen may be positioned inside or outside of the electronic device 201. The display 260 may further include a control circuit for controlling the panel 262, the hologram device 264, or the projector 266.

The interface 270 includes a high-definition multimedia interface (HDMI) 272, a universal serial bus (USB) 274, an optical communication 276, or a D-subminiature 278.

The interface 270 may include a mobile high-definition link (MHL) interface, an SD/multi-media card (MMC) interface, or an infrared data association (IrDA) interface.

The audio module 280 bi-directionally converts a sound and an electric signal. The audio module 280 processes sound information input or output through a speaker 282, a receiver 284, an earphone 286, or the microphone 288.

The camera module 291 is a device capable of capturing a still image or a moving image, and may include one or more image sensors (e.g., a front sensor or a rear sensor), a lens, an ISP, or a flash (e.g., an LED, a xenon lamp, etc.).

The power management module 295 manages power of the electronic device 201. The power management module 295 includes a power management integrated circuit (PMIC), a charger IC, or a battery gauge. The PMIC may have a wired and/or wireless charging scheme. The wireless charging scheme includes a magnetic-resonance type, a magnetic induction type, and an electromagnetic type, and for wireless charging, an additional circuit a coil loop, a resonance circuit, or a rectifier may be further included. The battery gauge measures the remaining capacity, voltage, current, or temperature of the battery 296. The battery 296 may include a rechargeable battery and/or a solar battery.

The indicator 297 displays a particular state a booting state, a message state, or a charging state, of the electronic device 201 or a part thereof (e.g., the processor 210).

The motor 298 converts an electric signal into mechanical vibration or generates a vibration or a haptic effect.

The electronic device 201 includes a processing device (e.g., a GPU) for supporting a mobile TV. The processing device for supporting the mobile TV processes media data according to a standard such as digital multimedia broadcasting (DMB), digital video broadcasting (DVB), or media-Flo™.

Each of the foregoing elements described herein may be configured with one or more components, names of which may vary with a type of the electronic device.

The electronic device may include at least one of the above-described elements, some elements may be omitted, or other elements may be added. In addition, some of the elements of the electronic device may be integrated into one entity to perform functions of the corresponding elements in the same manner as before they are integrated.

Figure 3:
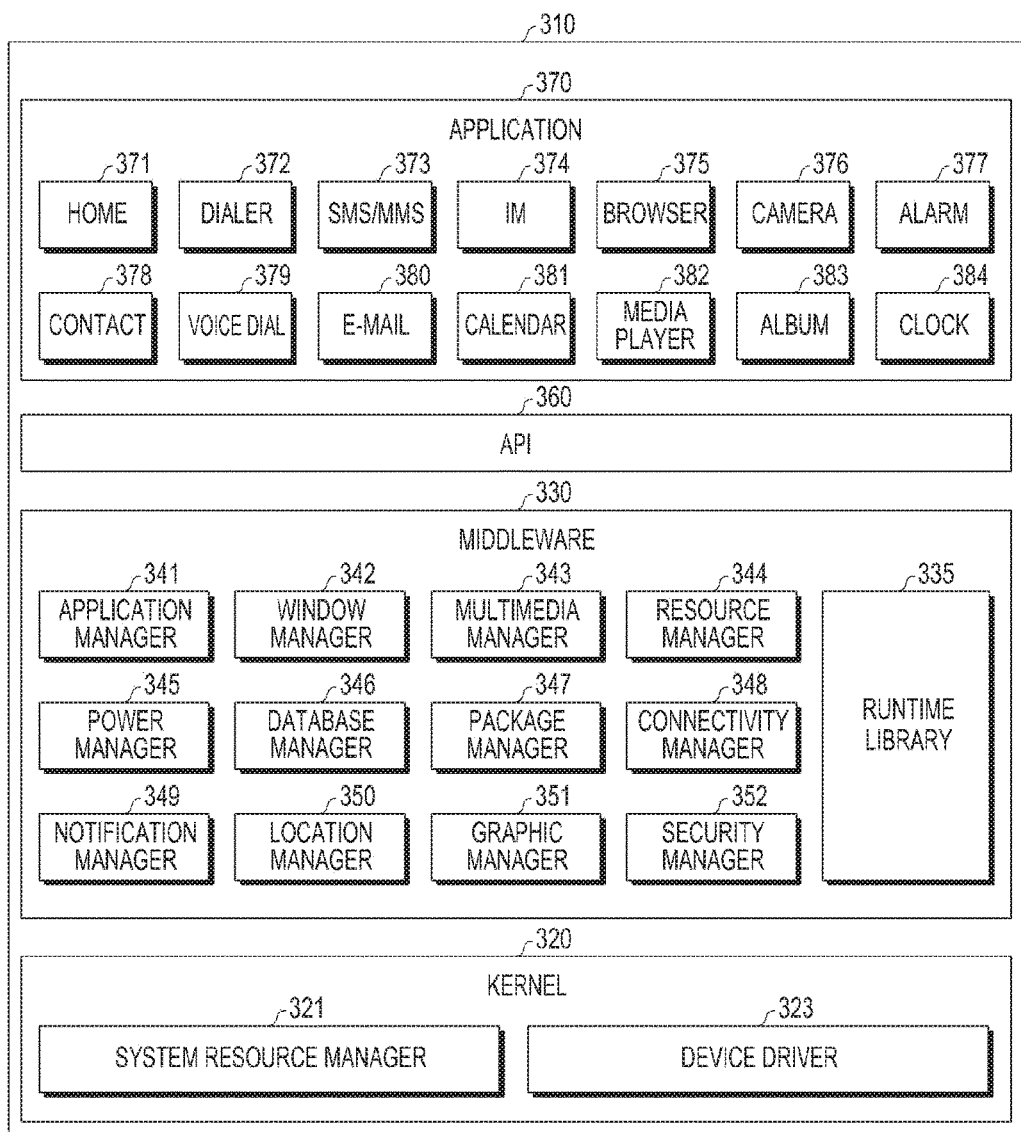
FIG. 3 is a block diagram of a configuration of a programming module, according to an embodiment of the present disclosure.

FIG. 3 is a block diagram of a configuration of a programming module, according to an embodiment of the present disclosure.

Referring to FIG. 3, a programming module 310 is provided. The programming module 310 may include an OS for controlling resources associated with the electronic device 101 and/or the applications 147 executed on the OS. The OS may include Android™, iOS™, Windows™, Symbian™, Tizen™, or Bada™.

The programming module 310 includes a kernel 320, middleware 330, an API 360, and/or an application 370. At least a part of the programming module 310 may be preloaded on an electronic device or may be downloaded from an external device (e.g., the external electronic device 102, BS 104 or the server 106).

The kernel 320 may include a system resource manager 321 and/or a device driver 323. The system resource manager 321 may perform control, allocation, retrieval of system resources, and so forth. The system resource manager 321 may include a process management unit, a memory management unit, or a file system. The device driver 323 may include, for example, a display driver, a camera driver, a BT driver, a shared memory driver, a USB driver, a keypad driver, a Wi-Fi driver, an audio driver, or an inter-process communication (IPC) driver.

The middleware 330 provides functions that the application 370 commonly requires or provides various functions to the application 370 through the API 360 to allow the application 370 to efficiently use a limited system resource in the electronic device 101. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs functions relating to an input/output, memory management, or calculation operation.

The application manager 341 manages a life cycle of at least one application 370.

The window manager 342 manages a graphics user interface (GUI) resource using a screen.

The multimedia manager 343 recognizes a format necessary for playing various media files and performs encoding or decoding on a media file by using a codec appropriate for a corresponding format.

The resource manager 344 manages a resource such as source code, memory, or storage space of at least one application 370.

The power manager 345 manages a battery or power in operation with a basic input/output system (BIOS) and provides power information necessary for an operation of the electronic device 101.

The database manager 346 performs a management operation to generate, search or change a database used for at least one application 370.

The package manager 347 manages the installation or update of an application distributed in a package file format.

The connectivity manager 348 manages a wireless connection such as a Wi-Fi or BT connection.

The notification manager 349 displays or notifies of events such as the arrival of messages, appointments, and proximity alerts in a manner that is not disruptive to a user.

The location manager 350 manages location information of the electronic device 101.

The graphic manager 351 manages a graphic effect to be provided to a user or a user interface relating thereto.

The security manager 352 provides a general security function necessary for system security or user authentication.

If the electronic device 101 has a call function, the middleware 330 may further include a telephony manager for managing a voice or video call function of the electronic device 101.

The middleware 330 may include a middleware module forming a combination of various functions of the above-mentioned internal elements. The middleware 330 may provide modules specified according to types of OS so as to provide distinctive functions. Additionally, the middleware 330 may delete some of the existing elements or add new elements dynamically.

The API 360 may be provided as a set of API programming functions with a different configuration according to the OS. In the case of Android™ or iOS™, for example, one API set may be provided by each platform, and in the case of Tizen™, two or more API sets may be provided.

The application 370 includes one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, and a clock application 384. The application 370 may additionally include a health care application (e.g., an application for measuring an exercise amount, a blood sugar level, etc.), or an environment information providing application (e.g., an application for providing air pressure, humidity, temperature information, etc.).

The application 370 may include an information exchange application supporting information exchange between the electronic device 101 and the external electronic device 102 or the BS 104. The information exchange application may include, for example, a notification relay application for transferring specific information to the external electronic device or a device management application for managing the external electronic device.

The notification relay application may include a function for transferring notification information generated in another application (e.g., an SMS/MMS application, an e-mail application, a health care application, or an environment information application) of the electronic device 101 to the external electronic device 102 or the BS 104. The notification relay application may receive notification information from an external electronic device to provide the same to a user.

The device management application may manage (e.g., install, remove, or update) at least one function (e.g., turn on/turn off of an external electronic device itself (or a part thereof) or control of brightness (or resolution) of a display) of the external electronic device 102 or the BS 104 communicating with the electronic device 101, a service provided by an application operating in an external electronic device or provided by the external electronic device (e.g., a call service or a message service).

The application 370 may include an application (e.g., device health care application of a mobile medical device) designated according to an attribute of the external electronic device (e.g., the external electronic device 102 or BS 104). The application 370 includes an application received from the external electronic device. The application 370 may include a preloaded application or a third party application that may be downloaded from the server 106. Names of elements of the programming module 310 may vary depending on a type of an OS.

At least a part of the programming module 310 may be implemented by software, firmware, hardware, or a combination thereof. The programming module 310 may be implemented (e.g., executed) by the processor 210. The programming module 310 may include, for example, modules, programs, routines, sets of instructions, or processes for performing one or more functions.

A term "module", used herein, may refer to a unit including one of or a combination of hardware, software, and firmware. The term "module" may be interchangeably used with the terms "unit", "logic", "logical block", "component, and "circuit".

The "module" may be a minimum unit or a portion of an integrated component, which performs one or more functions. The "module" may be implemented mechanically or electronically. For example, the "module" may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) may be implemented with a command stored in a computer-readable storage medium in the form of a programming module. When the instructions are executed by one or more processors, the one or more processors may perform functions corresponding to the instructions. The computer-readable storage medium may be a memory included in the memory 130.

The computer readable recording medium includes a hard disk, a floppy disk, or a magnetic medium (e.g., a magnetic tape, an optical medium (e.g., a compact disc read only memory (CD-ROM) or DVD, a magneto-optical medium (e.g., a floptical disk), a hardware device (e.g., ROM, RAM, flash memory, etc.), etc.

The program instructions include a machine language code created by a complier and a high-level language code executable by a computer using an interpreter.

The foregoing hardware device may be configured to be operated as at least one software module to perform an operation of the present disclosure, or vice versa.

Modules or programming modules may include one or more of the foregoing elements, have some of the foregoing elements omitted, or further include additional other elements. Operations performed by the modules, the programming modules, or other elements may be executed in a sequential, parallel, repetitive or heuristic manner. Also, some of the operations may be executed in different order or omitted, or may have additional different operations.

Figure 4:
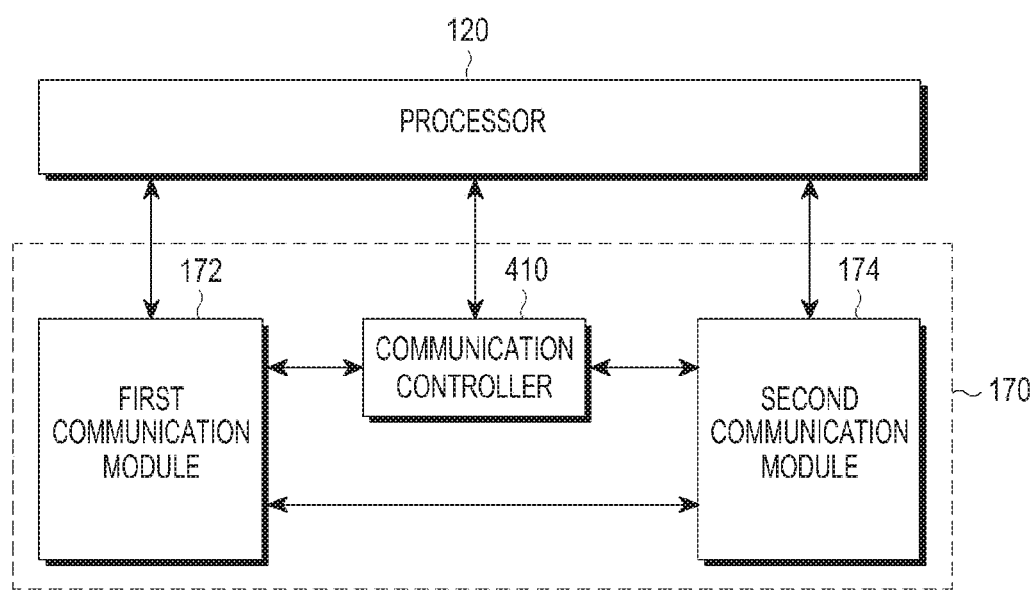
FIG. 4 is a block diagram of a processor and a communication interface included in an electronic device, according to an embodiment of the present disclosure.

FIG. 4 is a block diagram of a processor and a communication interface included in an electronic device, according to an embodiment of the present disclosure.

Referring to FIG. 4, the processor 120 and the communication interface 170 including the first communication module 172, the second communication module 174, and a communication controller 410, is provided. The communication interface 170 may operate under control of the processor 120.

The first communication module 172 may be a cellular module, and the second communication module 174 may be a WLAN module. The first communication module 172 may be used for cellular communication of the electronic device 101, e.g., LTE communication. The second communication module may be used for WLAN communication of the electronic device 101, e.g., an Internet connection through the WLAN, a WLAN direct connection, WLAN interworking through S2a or S2b, a hot spot, tethering, device paring, etc.

The communication controller 410, like the processor 120, determines whether to use the second communication module 174 implemented with the WLAN module for WLAN communication or for LTE-WLAN aggregation. Once the communication controller 410 determines to use the WLAN module for WLAN communication, the second communication module 174 performs an Internet connection through the WLAN, a WLAN direct connection, WLAN interworking through S2a or S2b, a hot spot, tethering, device paring, etc. If the communication controller 410 determines to use the WLAN module for LTE-WLAN aggregation, the second communication module 174 may be used for LTE-WLAN aggregation. The communication controller 410 determines an operation of the second communication module 174 based on the priority table stored in the memory 130.

The first communication module 172 and the second communication module 174 may be implemented as being included in one chipset. Alternatively, each of the first communication module 172 and the second communication module 174 may be implemented as being included in a separate chip. An interface between the first communication module 172 and the second communication module 174 may be physically implemented as a direct interface between chips, an interface in a chip, an interface through other modules (e.g., the processor 120, the communication controller 410, etc.), etc. The communication controller 410 may be included in the processor 120.

If the second communication module 174 is used for LTE-WLAN aggregation, the second communication module 174 may switch a data path. The data path may be determined by the processor 120 or the communication controller 410.

The second communication module 174 delivers data received from an external communication network to the processor 120 or data delivered from the processor 120 to the external communication network, through an interface with the processor 120. When the second communication module 174 is used for LTE-WLAN aggregation, the first communication module 172 for cellular communication and the second communication module 174 for LTE-WLAN aggregation, may transmit and receive data to and from each other. A data interface for data transmission and reception between the first communication module 172 and the second communication module 174 may exist between first communication module 172 and the second communication module 174. The second communication module 174 may selectively use the interface with the processor 120 or the interface with the first communication module 172, under control of the processor 120 or the communication controller 410.

The processor 120 or the communication controller 410 manages information about a service provider (e.g., an access point (AP)) that provides a data service to the electronic device 101. The processor 120 or the communication controller 410 generates an AP list indicating whether a service provider connected or connectable with the electronic device 101 supports LTE-WLAN aggregation, receives the AP list (from the service provider), and stores the AP list in the memory 130. The AP list may be as shown, for example, in Table 2.

TABLE 2

| Service Provider | Support of LTE-WLAN Aggregation |
|---|---|
| AP-01 | Supported |
| AP-02 | Non-Supported |
| AP-03 | Supported |
| AP-04 | Supported |
| . . . | . . . |

The processor 120 or the communication controller 410 updates the AP list according to a position of the electronic device 101. Once the position of the electronic device 101 is changed, the processor 120 or the communication controller 410 recognizes a service provider that is connected or connectable with the electronic device 101 in the changed position and changes the AP list according to the recognized service provider.

The processor 120 or the communication controller 410 uses an appropriate AP included in the AP list for LTE-LAN aggregation. For example, the AP having the best performance (e.g., sensitivity) among the plurality of APs in the AP list may be selected for use in LTE-WLAN aggregation.

The processor 120 controls the display 160 to display the AP list. The processor 120 controls the display 160 to display only a service provider supporting LTE-WLAN aggregation in the AP list and receives a user input for selecting any one of service providers in the AP list through the I/O interface 150.

An electronic device according to an embodiment includes a first communication module configured to communicate with an external device through a first communication scheme, a second communication module configured to communicate with the external device through a second communication scheme, and a processor configured to identify a state of the second communication module, generate availability information indicating whether the second communication module is available to perform a same function with the first communication module, based on the state of the second communication module, and control the first communication module or the second communication module to transmit the availability information of the second communication module to the external device.

Figure 5:
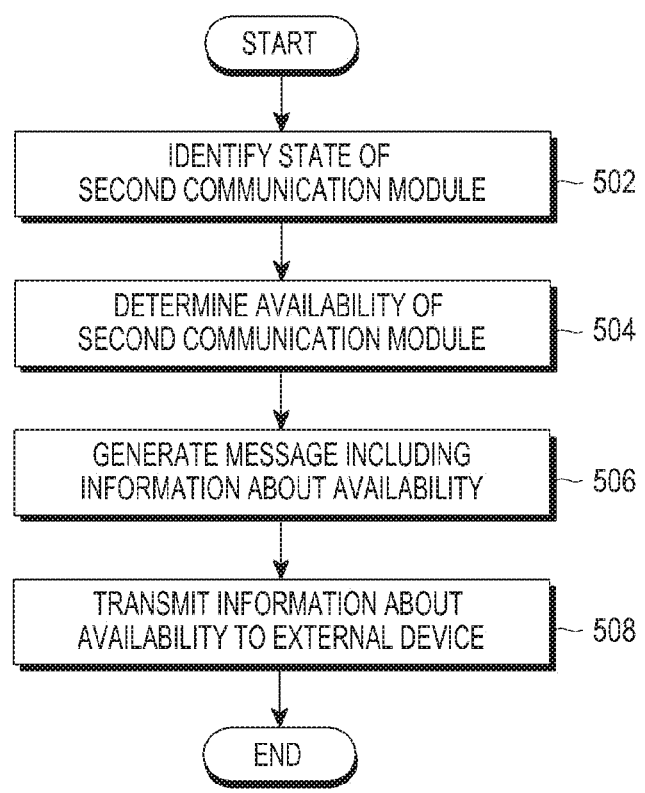
FIG. 5 is a flowchart of a method for operating an electronic device, according to an embodiment of the present disclosure.

FIG. 5 is a flowchart of a method for operating an electronic device, according to an embodiment of the present disclosure.

Referring to FIG. 5, a method of operating the electronic device 101 is provided.

In step 502, the processor 120 of the electronic device 101 identifies a state of the second communication module 174 (e.g., the WLAN module).

In step 504, the processor 120 determines availability of the second communication module 174. The availability may indicate whether the second communication module 174 is available to perform the same function as the first communication module 172 (e.g., the cellular communication module). Performing the same function may mean that the second communication module 174 receives a data stream from the BS 104 when the first communication module 172 receives the data stream from the BS 104 through cellular communication. In this case, different communication channels may be allocated to the first communication module 172 and the second communication module 174 by the BS 104, and data delivered to the first communication module 172 and the second communication module 174 may also be different parts of the data stream.

Once availability is determined, then in step 506, the processor 120 generates a message including information about the availability.

In step 508, the processor 120 controls the communication interface 170 to transmit the message to an external device, e.g., the BS 104.

Figure 6:
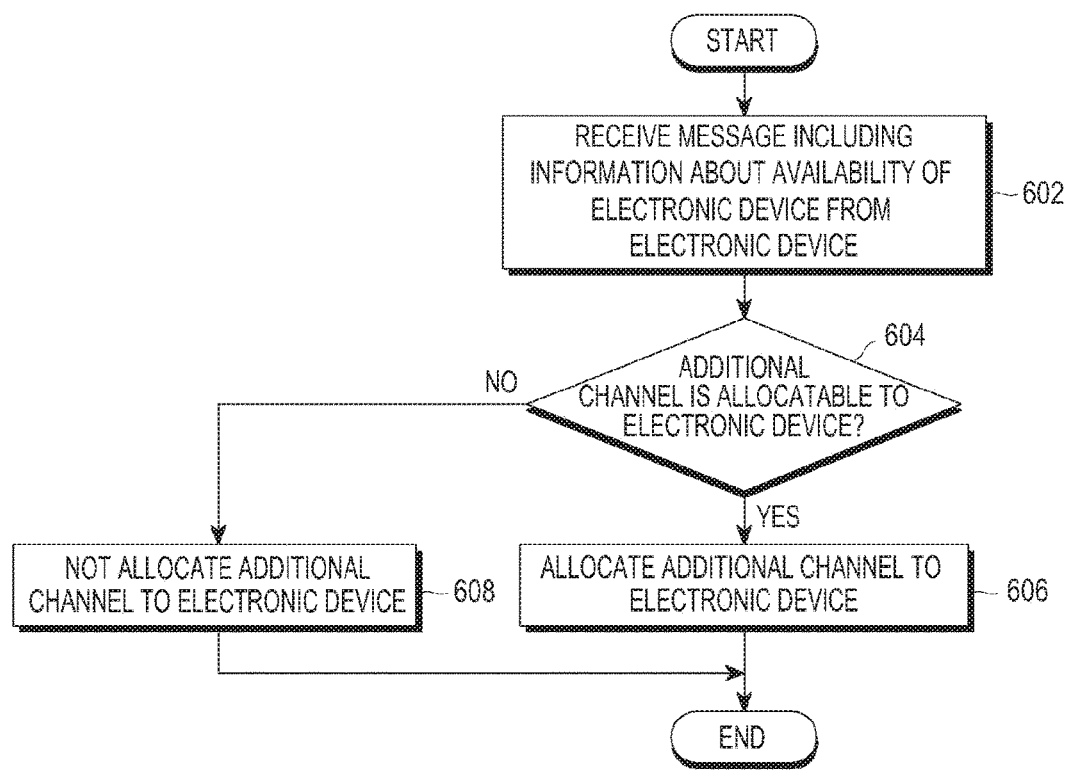
FIG. 6 is a flowchart of a method for operating an external device connected with an electronic device, according to an embodiment of the present disclosure.

FIG. 6 is a flowchart of a method for operating an external device connected with an electronic device, according to an embodiment of the present disclosure.

Referring to FIG. 6, a method of operating an external device (e.g., the BS 104 or the external electronic device 102) connected with the electronic device 101 is provided. In FIG. 6, the external device is assumed to be the BS 104 and the electronic device 101 is assumed to perform cellular communication with the BS 104 through the first communication module 172.

In step 602, the BS 104 receives a message including availability information of the electronic device 101, from the electronic device 101.

In step 604, the BS 104 determines whether an additional channel is allocatable to the electronic device 101 based on the message received from the electronic device 101. The message received may be a radio resource control (RRC) message, which may be transmitted to the BS 104 from the electronic device 101 at preset intervals.

If it is determined that the additional channel is allocatable to the electronic device 101, then in step 606, the BS 104 allocates an additional channel, e.g., a communication channel for LTE-WLAN aggregation, to the electronic device 101. The electronic device 101 performs data aggregation by using the additional channel.

If it is determined that the additional channel is not allocatable to the electronic device 101, then in step 608, the BS 104 does not allocate an additional channel to the electronic device 101.

Figure 7:
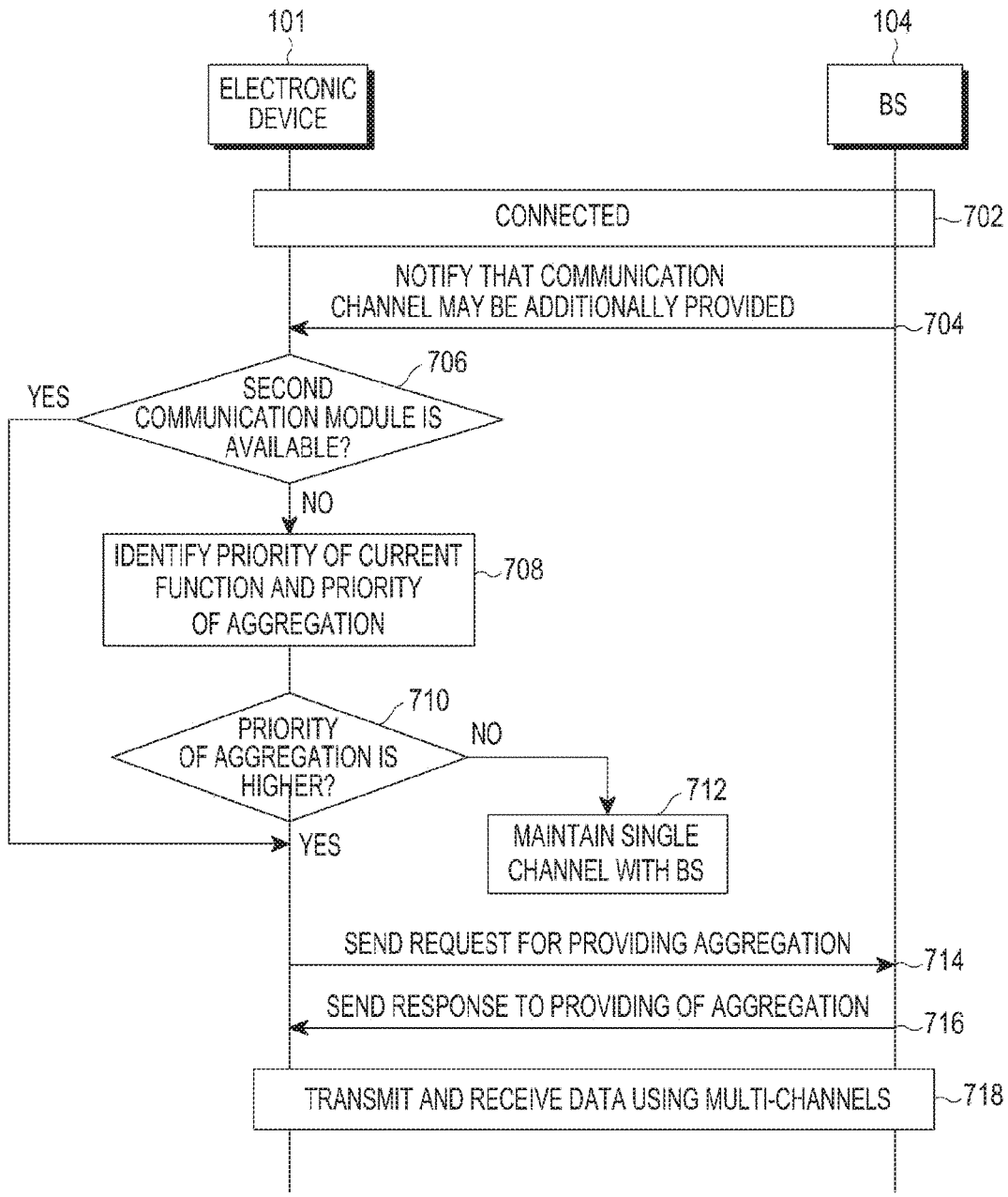
FIG. 7 is a flowchart of a method of an external device and an electronic device, according to an embodiment of the present disclosure.

FIG. 7 is a flowchart of a method of an external device and an electronic device, according to an embodiment of the present disclosure.

Referring to FIG. 7, a method of the BS 104 and the electronic device 101 is provided.

In step 702, the electronic device 101 is connected to a service provider, e.g., the BS 104 through cellular communication.

In step 704, the BS 104 sends the electronic device 101 a notification indicating that the communication channel may be additionally provided to the electronic device 101. The BS 104 and the electronic device 101 may be connected through two or more channels, i.e., multi-channels, and the electronic device 101 may perform aggregation, e.g., LTE-WLAN aggregation, through the second communication module 174, by being connected through the multi-channels.

In step 706, the processor 120 of the electronic device 101, having received the notification, determines whether the second communication module 174, i.e., the WLAN module is available, that is, whether the second communication module 174 is available.

If it is determined that the second communication module 174 is available, then the processor 120 proceeds to step 714. If it is determined that the second communication module 174 is not available, then the processor 120 proceeds to step 708.

In step 708, the processor 120 identifies a priority of a function currently executed in the second communication module 174 and a priority of aggregation (e.g., LTE-WLAN aggregation). The priority identification may be performed by referring to the priority table previously stored in the memory 130.

In step 710, the processor 120 determines whether the priority of aggregation (e.g., LTE-WLAN aggregation) is higher than the priority of the function currently executed by the second communication module 174.

If it is determined that the priority of the aggregation is not higher than the priority of the function currently executed by the second communication module 174, then in step 712, the processor 120 maintains the communication channel connected with the BS 104 as a single channel. The single channel may be a channel used for data transmission and reception between the first communication module 172 and the BS 104. In other words, if the priority of aggregation (e.g., LTE-WLAN aggregation) is not higher than the priority of the function currently executed by the second communication module 174, the processor 120 controls the electronic device 101 such that the second communication module 174 maintains the currently executed function.

If it is determined that the priority of aggregation (e.g., LTE-WLAN aggregation) is higher than the priority of the function currently executed by the second communication module 174, then the processor 120 proceeds to step 714.

In step 714, the processor 120 controls the electronic device 101 to send a request for providing aggregation (e.g., LTE-WLAN aggregation) to the BS 104. The electronic device 101 may also send a request for allocating an additional channel to the BS 104.

In step 716, the BS 104 sends a response to the electronic device 101 in response to the request for providing aggregation. The electronic device 101 may further be allocated with the additional channel from the BS 104. As the additional channel is allocated to the electronic device 101, two or more channels, i.e., multi-channels may be formed between the electronic device 101 and the BS 104.

Once the additional channel is allocated to the electronic device 101 in this way, then in step 718, the electronic device 101 and the BS 104 transmit and receive data to and from each other through multi-channels.

Figure 8:
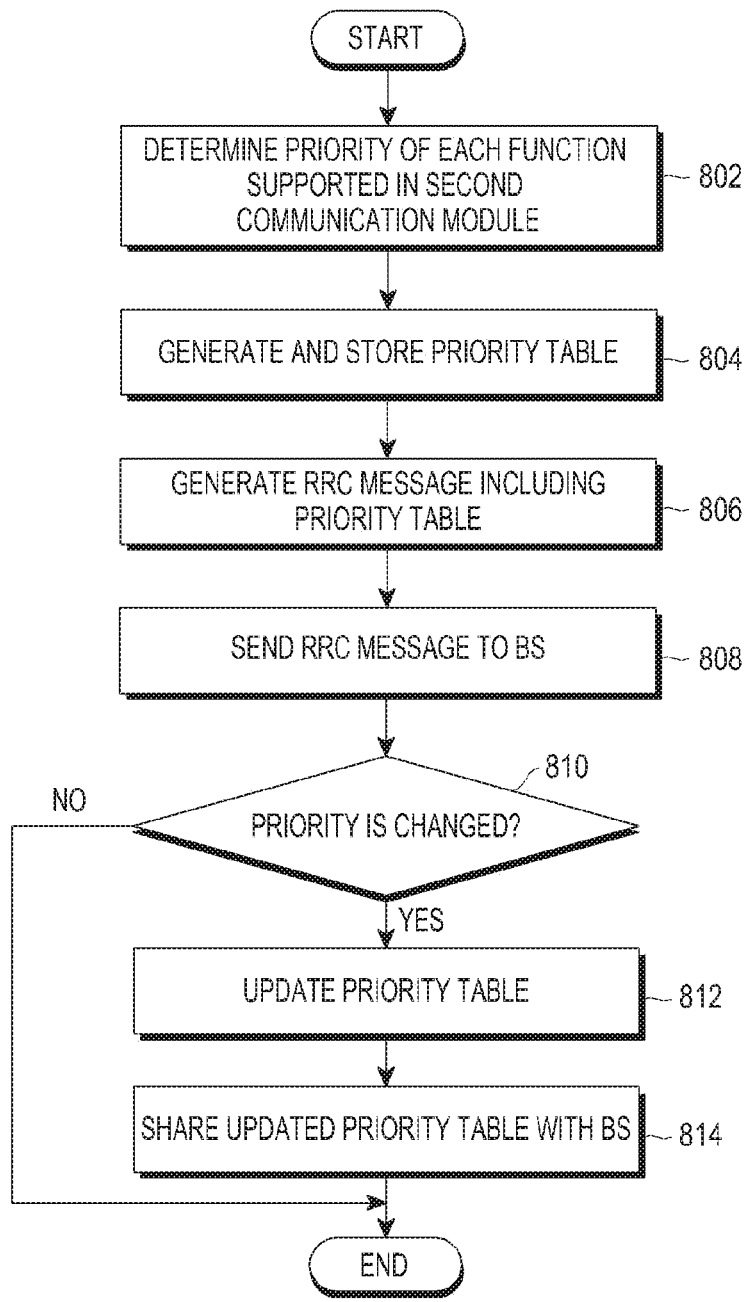
FIG. 8 is a flowchart of a method for operating an electronic device, according to an embodiment of the present disclosure.

FIG. 8 is a flowchart of a method for operating an electronic device, according to an embodiment of the present disclosure.

Referring to FIG. 8, a method for operating the electronic device 101 is provided.

In step 802, the processor 120 of the electronic device 101 including the first communication module 172 and the second communication module 174 determines a priority of each function supported by the second communication module 174. The processor 120 may determine a priority of each of the functions supported by the second communication module 174, e.g., an Internet connection through the WLAN, a WLAN direct connection, WLAN interworking through S2a or S2b, a hot spot, tethering, device paring, LTE-WLAN aggregation, etc. The priority may be determined according to a communication environment (e.g., an environment supported by WiFi, etc.) of the electronic device 101 or a user input.

Once a priority of each function supported by the second communication module 174 is determined, then in step 804, the processor 120 generates a priority table for each function and stores the priority table.

In step 806, the processor 120 generates the RRC message including the priority table.

In step 808, if the RRC message is generated, the processor 120 sends (or broadcasts) the RRC message to the BS 104.

In step 810, the processor 120 determines whether the priority of each function supported by the second communication module 174 is changed. The priority of each function supported by the second communication module 174 may be changed according to a communication environment (e.g., an environment supported by WiFi, etc.) of the electronic device 101 or a user input. For example, the processor 120 may recognize a function mainly used in the second communication module 174 to adjust the priority of the function up or may recognize an infrequently used function to adjust the priority of the function down. The processor 120 may change the priority according to a user input.

If it is determined that the priority is not changed, the processor 120 does not perform a separate operation or maintains the current state of the electronic device 101.

If it is determined that the priority is changed, then in step 812, the processor 120 updates the priority table by reflecting the changed priority.

In step 814, the processor 120 controls the communication interface 170 to share the updated priority table with the BS 104. The processor 120 generates the RRC message including the updated priority table and sends (or broadcasts) the RRC message to the BS 104 through the communication interface 170 to share the updated priority table with the BS 104.

According to an embodiment of the present disclosure, a method for operating an electronic device, including a first communication module configured to communicate with an external device through a first communication scheme, a second communication module configured to communicate with the external device through a second communication scheme, and a processor configured to identify a state of the second communication module, generate availability information indicating whether the second communication module is available to perform a same function with the first communication module, based on the state of the second communication module, and control the first communication module or the second communication module to transmit the availability information of the second communication module to the external device.

According to an embodiment of the present disclosure, a storage medium included in an electronic device including a first communication module configured to communicate with an external device through a first communication scheme, a second communication module configured to communicate with the external device through a second communication scheme, and a processor, has stored therein instructions that, when executed by at least one processor, cause the at least one processor to perform at least one operation that includes identifying a state of the second communication module, generating availability information indicating whether the second communication module is available to perform a same function with the first communication module, based on the state of the second communication module; and transmitting the availability information of the second communication module to the external device.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device comprising:
   first communication circuitry configured to communicate with an external device through a first communication scheme;
   second communication circuitry configured to communicate with the external device through a second communication scheme; and
   a processor configured to:
   identify whether the second communication circuitry is available to perform a same function with the first communication circuitry, and
   based on identifying the second communication circuitry being available to perform the same function with the first communication circuitry, control the first communication circuitry or the second communication circuitry to transmit the identified availability information of the second communication circuitry to the external device,
   wherein the identified availability information includes a priority of at least one function supported in the second communication circuitry.

2. The electronic device of claim 1, wherein the processor is further configured to:
   if the second communication circuitry communicates with another external device, determine that the first communication circuitry and the second communication circuitry are not available to perform the same function together.

3. The electronic device of claim 1, wherein the processor is further configured to:
   control the first communication circuitry or the second communication circuitry to transmit the identified availability information of the second communication circuitry to the external device, in response to a communication request from the external device.

4. The electronic device of claim 1, wherein the processor is further configured to:
   control the first communication circuitry or the second communication circuitry to transmit the identified availability information of the second communication circuitry to the external device, based on a user input inputted to the electronic device.

5. The electronic device of claim 1, wherein the processor is further configured to:
   determine whether the external device connected with the first communication circuitry supports multi-channel connection with the electronic device, and
   if the external device supports the multi-channel connection, control the first communication circuitry or the second communication circuitry to transmit the identified availability information of the second communication circuitry to the external device.

6. The electronic device of claim 5, wherein the processor is further configured to:
   provide a radio resource control (RRC) message, including the priority of the at least one function, and
   control the first communication circuitry or the second communication circuitry to transmit the RRC message to the external device.

7. The electronic device of claim 6, wherein the processor is further configured to:
   if a priority for a function currently executed by the second communication circuitry is lower than a priority for establishment of a communication channel with the external device, control the first communication circuitry or the second communication circuitry to transmit a request for allocating the communication channel to the external device.

8. The electronic device of claim 7, wherein the processor is further configured to:
   if the priority for the function currently executed by the second communication circuitry is not lower than the priority for the establishment of the communication channel with the external device, maintain a single channel between the first communication circuitry and the external device.

9. A method for operating an electronic device comprising first communication circuitry and second communication circuitry, the method comprising:
   identifying whether the second communication circuitry is available to perform a same function with the first communication circuitry; and
   based on identifying the second communication circuitry being available to perform a same function with the first communication circuitry, transmitting the identified availability information of the second communication circuitry to the external device,
wherein the first communication circuitry is configured to communicate with an external device through a first communication scheme and the second communication circuitry is configured to communicate with the external device through a second communication scheme, and
wherein the identified availability information includes a priority of at least one function supported in the second communication circuitry.

10. The method of claim 9, further comprising:
if the second communication circuitry communicates with another external device, determining that the first communication circuitry and the second communication circuitry are not available to perform the same function together.

11. The method of claim 9, wherein transmitting the identified availability information of the second communication circuitry to the external device comprises:
transmitting the identified availability information of the second communication circuitry to the external device, in response to a communication request from the external device.

12. The method of claim 9, wherein transmitting the identified availability information of the second communication circuitry to the external device comprises:
transmitting the identified availability information of the second communication circuitry to the external device, based on a user input inputted to the electronic device.

13. The method of claim 9, wherein transmitting the identified availability information of the second communication circuitry to the external device comprises:
identifying whether the external device connected with the first communication circuitry supports multi-channel connection with the electronic device; and
if the external device supports the multi-channel connection, transmitting the identified availability information of the second communication circuitry to the external device.

14. The method of claim 13, further comprising:
providing a radio resource control (RRC) message including the priority of the at least one function; and
transmitting the RRC message to the external device.

15. The method of claim 13, further comprising:
if a priority for a function currently executed by the second communication circuitry is lower than a priority for establishment of a communication channel with the external device, transmitting a request for allocating the communication channel to the external device.

16. The method of claim 15, further comprising:
if the priority for the function currently executed by the second communication circuitry is not lower than the priority for the establishment of the communication channel with the external device, maintaining a single channel between the first communication circuitry and the external device.

17. A non-transitory, computer-readable, storage medium included in an electronic device comprising first communication circuitry and second communication circuitry, wherein the storage medium has stored thereon instructions that, when executed, perform the steps of:
identifying whether the second communication circuitry is available to perform a same function with the first communication circuitry, based on the state of the second communication circuitry; and
based on identifying the second communication circuitry being available to perform a same function with the first communication circuitry, transmitting the identified availability information of the second communication circuitry to an external device,
wherein the first communication circuitry is configured to communicate with an external device through a first communication scheme and the second communication circuitry is configured to communicate with the external device through a second communication scheme, and
wherein the identified availability information includes a priority of at least one function supported in the second communication circuitry.

* * * * *